UNITED STATES PATENT OFFICE.

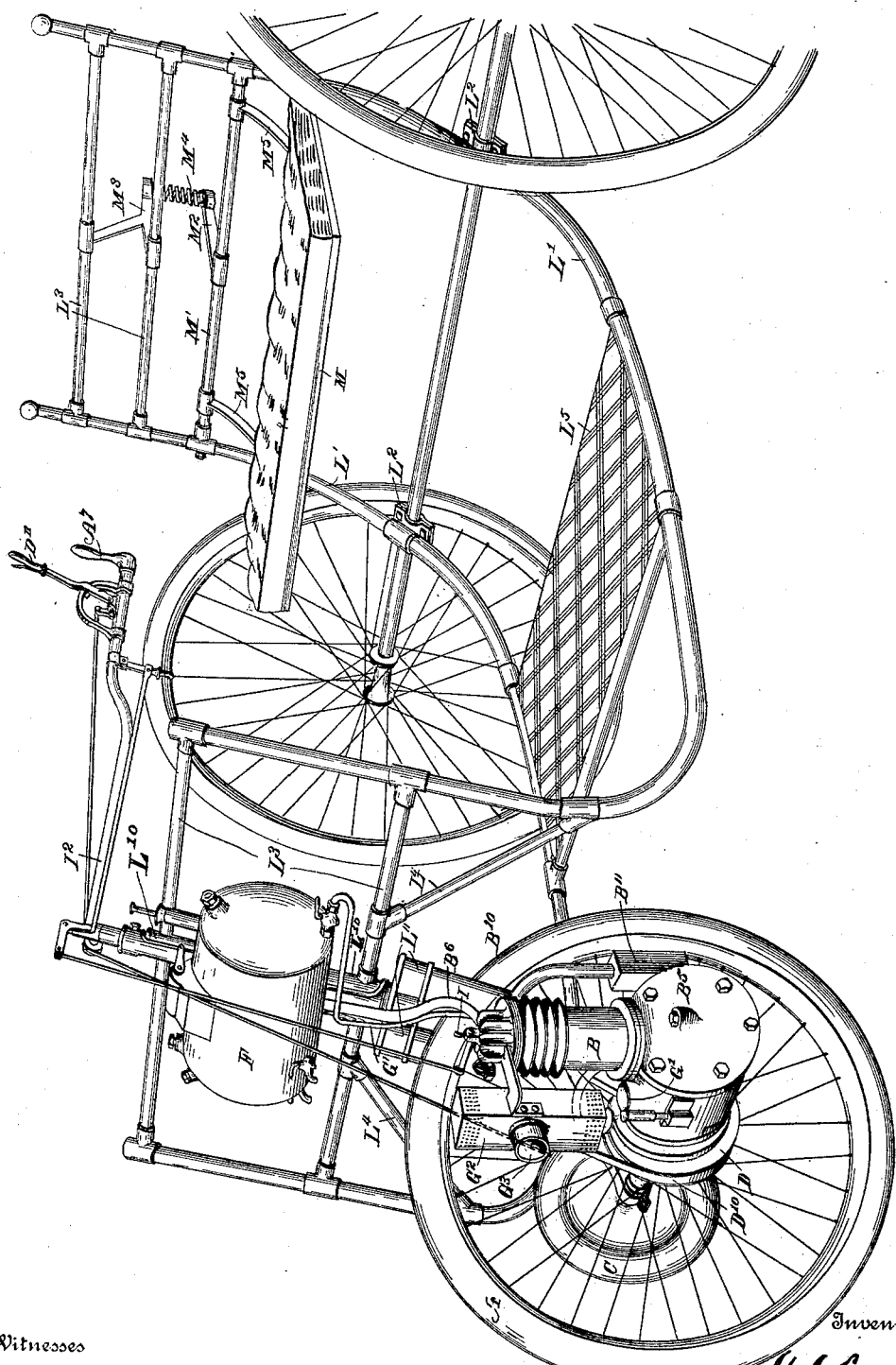

HENRY JOHN LAWSON, OF LONDON, ENGLAND.

MOTOR-VEHICLE.

SPECIFICATION forming part of Letters Patent No. 688,101, dated December 3, 1901.

Original application filed January 31, 1900, Serial No. 3,421. Divided and this application filed September 16, 1901. Serial No. 75,543. (No model.)

*To all whom it may concern:*

Be it known that I, HENRY JOHN LAWSON, a subject of the King of England, and a resident of the city of London, in the Kingdom of England, have invented and produced certain new and useful Improvements in Vehicles, of which the following is a full, clear, and exact description.

This application is a division of my application filed January 31, 1900, Serial No. 3,421; and my present invention relates generally to the improvements in the construction of vehicles, and specifically to the construction of three-wheeled vehicles, intended more particularly for the application of a propelling motor or motors to the third or front wheel, as set forth in my Letters Patent of the United States, No. 633,014, issued September 12, 1899.

My present invention is illustrated in the accompanying drawing, which is a perspective view of the improved vehicle.

The frame of the vehicle comprises two main longitudinal U-shaped members $L'$ $L'$, each secured rigidly to the rear axle at $L^2$ and braced by transverse members $L^3$ at their upper ends. The fore part of the frame is provided with a steering-socket $L^{10}$, within which is mounted the steering-fork $L^{11}$ for the wheel A, having at its upper end a lever $A^7$, by which it may be steered. The motor and its parts are arranged in any suitable manner, such as that described in my Letters Patent above mentioned. The lower front transverse member is braced to the longitudinal members $L'$ by struts $L^4$ to give additional strength to that part of the frame, and at a convenient point on the upper end of the members $L'$, at the rear of the vehicle, is a seat M, carried by arms $M^3$, projecting forwardly from a transverse rod $M'$, pivoted between the members $L'$. A lever $M^2$ is secured to the rod $M'$ and projects rearwardly, approximately at right angles from the same, opposite a bracket $M^3$, above it, and which is rigidly secured to transverse members $L^3$. Between the bracket $M^3$ and lever $M^2$ is a spring $M^4$, by which the seat M is maintained in an approximately horizontal position. This spring is also necessary to take up vibration, (as the vehicle has no axle-springs,) thus preventing the same from being communicated to the rider. A footboard $L^5$, which also serves as a transverse strut to give additional rigidity to the lower part of the frame, is conveniently secured to the members $L'$ beneath and preferably slightly in advance of the seat M.

Upon the upper ends of the longitudinal members $L'$ $L'$ a canopy may be mounted in any suitable manner, such as by securing it directly to extensions of the said members or to a light frame attached to the same.

The levers for operating the different parts of the motor may conveniently be arranged upon the steering-rod $A^7$, any number of levers being provided, according to the different requirements. The lever $D^{11}$ for operating the band-brake $D^{10}$ is shown in this case as provided with a rack and detent; but, if preferred, it may be arranged in any other convenient manner.

For convenience the casing $G^2$ of the ignition-tube and burner may be provided with one or more apertures $G^3$, closed with talc or glass, either plain or colored, to serve as a road-light or danger-signal.

The construction of vehicle above described is especially adapted to meet the requirements of a three-wheeled vehicle in that the frame may be made broad to prevent overturning, while the structure is at the same time extremely light and rigid.

I claim—

1. A motor-vehicle comprising longitudinal U-shaped side members, a rear axle to which the rear ends of said side members are secured and above which they project, a seat carried by the rear portion of the vehicle, transverse members rigidly fixed to the front ends of the longitudinal U-shaped side members, and propelling and steering mechanism suitably mounted on the front end of said vehicle.

2. A motor-vehicle comprising the longitudinal U-shaped side members, the rear axle fixed to the rear portions of said longitudinal U-shaped side members, the seat carried by the rear portion of the vehicle, the transverse members rigidly secured to the front ends of the side members, the steering-socket fixed upon said transverse members the steering-fork fitted in said socket and having means for controlling it, and the motor-wheel carried by said fork.

3. A motor-vehicle comprising the longitudinal U-shaped side members, the rear axle and seat secured to the rear portions of said side members, a plurality of transverse members secured to the front portions of said side members, the steering-head secured to the said transverse members, and fuel-supply apparatus mounted upon said steering-head between the transverse members.

4. A motor-vehicle comprising front propelling and steering mechanism, the longitudinal U-shaped side members to the front portions of which said propelling and steering mechanism is suitably connected, the rear axle secured to the rear portions of said side members, the transverse members fixing the rear ends of said side members, and the transverse rod carrying a seat, also secured between said rear portions of said side members.

5. In a motor-vehicle the combination with a frame embodying the two longitudinal side members and a rear transverse member fixed to said side members, a transverse bar fitted to turn between said side members adjacent to said transverse member, a seat supported upon the turning-bar, projections on said turning-bar and transverse member, respectively, and a spring between said projections.

6. In a motor-vehicle, the combination of the longitudinal U-shaped side members, the wheels suitably secured to front and rear portions thereof, the rear transverse members fixed to the rear upper portions of said longitudinal U-shaped members, the transverse bar beneath the fixed transverse members fitted to turn between said side members, the seat, arms upon which said seat is supported, projecting forwardly from said turning-bar, a lever projecting rearwardly from said turning-bar, a bracket projecting from and braced by the fixed transverse members, and a spring between said bracket and the lever, forcing them apart and holding the seat in proper position with a yielding force.

7. In a motor-vehicle the combination of the longitudinal U-shaped side members, the seat and wheels secured to the rear portions thereof, the intermediate transverse members and foot-rest secured to the lower intermediate portions of said U-shaped members the front transverse members secured to the front portions of said side members and the propelling and steering mechanism secured to said front transverse members.

8. In a motor-vehicle the combination of the longitudinal U-shaped side members, the rear wheels and seat secured to rear portions thereof, the foot-rest secured to intermediate portions of said side members, the front transverse members secured to the front portions of said members the struts bracing said members with a front transverse member, and a steering-head secured to said front transverse members and carrying suitable propelling and steering mechanism.

HENRY JOHN LAWSON.

In presence of—
A. M. HAYWARD,
G. F. WARREN.